United States Patent [19]

Hoppe et al.

[11] 3,945,983

[45] Mar. 23, 1976

[54] WATER SOLUBLE COPOLYAMIDE FROM (1) POLYALKYLENE POLYAMINE, (2) DICARBOXYLIC ACID, (3) DIAMINE OR LACTAM OR AMINO ACID AND (4) EPICHLOROHYDRIN

[75] Inventors: Lutz Hoppe; Rudolf Behn, both of Walsrode, Germany

[73] Assignee: Wolff Walsrode AG, Walsrode-Bomlitz, Germany

[22] Filed: Feb. 26, 1973

[21] Appl. No.: 335,957

[30] Foreign Application Priority Data
Feb. 26, 1972 Germany............................ 2209242

[52] U.S. Cl. ...... 260/78 L; 260/29.2 EP; 260/78 A; 260/78 SC; 260/78 UA; 428/475
[51] Int. Cl.² ......................................... C08G 69/48
[58] Field of Search......... 260/78 SC, 29.2 N, 78 A, 260/78 V, 29.2 EP

[56] References Cited
UNITED STATES PATENTS

| | | | |
|---|---|---|---|
| 2,926,154 | 2/1960 | Keim............................... | 260/78 SC |
| 3,250,664 | 5/1966 | Conte et al. .................... | 260/78 SC |
| 3,329,657 | 7/1967 | Strazdins et al................. | 260/78 SC |
| 3,442,754 | 5/1969 | Espy................................ | 260/78 SC |
| 3,640,840 | 2/1972 | Zieman et al. .................. | 260/78 SC |
| 3,761,350 | 9/1973 | Munjat et al..................... | 260/78 SC |

*Primary Examiner*—Harold D. Anderson
*Attorney, Agent, or Firm*—Plumley & Tyner

[57] ABSTRACT

A process for the production of an anchoring agent of copolyamide resin by condensing certain amounts of polyalkylene polyamines, dicarboxylic acids and at least one member of the group consisting of diamine, ε-caprolactam and amino caproic acid, and then reacting the secondary amino groups of said copolyamide partially with epichlorhydrin for crosslinking.

6 Claims, No Drawings

WATER SOLUBLE COPOLYAMIDE FROM (1) POLYALKYLENE POLYAMINE, (2) DICARBOXYLIC ACID, (3) DIAMINE OR LACTAM OR AMINO ACID AND (4) EPICHLOROHYDRIN

PRIOR ART

This invention relates to a process for the production of a water-soluble, thermo-setting anchoring agent of copolyamide resin by condensing a monomer mixture containing polyalkylene polyamines, dicarboxylic acids and diamines and crosslinking said copolyamide with epichlorhydrin, for anchoring polyvinylidene halide copolymers to sheet structures of cellulose compounds.

Synthetic resins of this kind are known per se from the literature, although to some extent these known synthetic resins are used for different purposes.

Thus, U.S. Pat. No. 2,926,154 describes a synthetic resin which is used to increase the wet strength of paper. To prepare this synthetic resin, a polyalkylene polyamine is polycondensed with a saturated, aliphatic dicarboxylic acid and the reactive amino groups in the resulting polycondensate are subsequently crosslinked with epichlorhydrin. Unfortunately, this synthetic resin product is not stable in storage with the result that this aqueous synthetic resin solution undergoes a rapid increase in viscosity and gels completely after only 2 days. Even a corresponding sythetic resin solution acidified to improve stability gels after only 7 days and can no longer be used. It was also found that an anchoring agent as defined above on account of the limited adhesion of the product to other materials could not be achieved.

The product disclosed in U.S. Pat. No. 3,250,664 which was reproduced for comparison purposes resulted in equally poor results. Neither its stability in storage nor its anchoring strength was satisfactory (cf. Comparison Example V 1b).

German published application (DOS) No. 1,696,181 recommends a chemically related product for improving the bursting pressure of hoses. A water-soluble epichlorhydrin-polyamide reaction product is also preferred in this case, the molar ratio of epichlorhydrin to secondary amino groups in the polyamide amounting to about 1.0–1.5 mol. Although results from tests based on this Patent Specification are not yet available in sufficient numbers for forming an average value, it can be said on the evidence currently available that the stability in storage of the water-soluble product does not exceed a period of 6 days, whilst its ability to anchor various products in the sense defined above is very little (cf. Comparison Example V 1c).

German published application (DOS) 1,696,248 relates to a modification of the processes for producing water-soluble synthetic resins of this kind disclosed in the Patent Specification referred to above insofar as it describes the use of glycerin-dichlorhydrin as a preliminary stage of epichlorhydrin, rather than epichlorhydrin itself, for reaction with the secondary amino groups of the polyamide resin produced from polyalkylene polyamines giving a commerical and economic advantage. However, reproduction of the process for producing the product disclosed in DOS No. 1,696,248, has shown that the stability of this product in storage is even poorer than that of the other known products referred to above and that the adhesion of polyvinylidene halide copolymer lacquers to sheet structures of cellulose compounds is also totally unsatisfactory (cf. Comparison Example V 1d).

In addition, the teaching of DOS 1,696,248 would not seem to be readily applicable, even where this water-soluble synthetic resin is used merely for improving the wet strength of cellulose substances which is reflected in better dimensional stability in the case of cellulose-containing tubular food casings, because epichlorhydrin is again used instead of the glycerin-dichlorhydrin in the later Patent Application DOS No. 1,719,297. Since the teaching of this application on the composition of this water-soluble synthetic resin is confined to the statement that the products in question were already commercially available at the beginning of 1967, this statement can only be interpreted to relate to resins of the kind which show poor stability in storage and whose anchoring strengths between polyvinylidene halide copolymer lacquers on the one hand and cellulose substances on the other hand is unsatisfactory.

In order to overcome this troublesome deficiency which still exists in spite of the considerable demand for sheet structures of high wet strength, the most recent publication, German published application (DOS) 1,906,561, discloses a water-soluble, thermo-setting synthetic resin having a considerably improved stability in storage obtained by co-condensation of $\epsilon$-caprolactam.

Unfortunately, considerable difficulties are involved in using such a product as an agent for anchoring a lacquer of polyvinylidene halide copolymers to cellulose-containing tubular casings. The known water-soluble thermo-setting synthetic resin is unable to wet uniformly an optionally fibre-containing cellulose regenerate casing so that the aqueous resin solution runs off the unwetted areas and forms droplets which do not completely harden during the subsequent drying process. Accordingly, the tubular film is unevenly coated with the anchoring agent. Therefore, it can also be subsequently coated unevenly with a polyvinylidene halide lacquer during the following lacquering operation. This means that the permeability of the material to water vapour is only slightly improved and a tube of this kind can no longer be used as a sausage casing. Since adhesion of the lacquer is only moderate at the preferred molar ratio of secondary amino groups to epichlorhydrin of 1.0 to 1.5 according to the aforementioned DOS, polyvinylidene halide lacquer fractions temporarily adhering to sausage-filled casing are detached during boiling. Accordingly, the sausage which is hung up after boiling loses water very quickly which is undesirable for reasons of taste alone and also on account of the appearance of the sausage. The high permeability of the sausage casing to oxygen, which is another result of defective lacquering, quickly deprives the sausage of its preservation properties, depending upon the composition of the sausage.

Moreover, the recommendation of the known publication to use epichlorhydrin in a stoichiometric excess, involves the danger that after the synthetic resin has been applied to the surface of the cellulose-containing casing, the epichlorhydrin phase separates from the aqueous solution of the polyalkylene polyamide on account of the insolubility of the epichlorhydrin in water. Also, the glycerin generally used as plasticiser for cellulose-containing tubular films is dissolved out of the film by the free epichlorhydrin. If even the water-soluble synthetic resin of polyalkylene polyamides and epichlorhydrin is not used in the production of food casings, but in the production of other sheet structures, for example those used for packaging purposes, it is not possible to produce satisfactory coatings of polyvinylidene halide copolymer lacquers on cellulose-containing sheet structures.

In view of the considerable, ever increasing demand for sheet structures of this kind, the absence of a suitable water-soluble, thermo-setting, polycondensed synthetic resin cross-linked with epichlorhydrin as an anchoring agent is proving to be a serious fault and a genuine bottleneck in production.

OBJECT OF THE INVENTION

It is therefore an object of the invention to provide a suitable process for the production of a copolyamide resin which not only improves the wet strength of cellulose-containing materials, i.e. strengthens the cellulose-cellulose bond, but which also bonds synthetic polymer substances, such as polyvinylidene halide copolymers, more effectively to the cellulose-containing substance.

THE INVENTION

Accordingly this invention relates to a process for the production of water-soluble copolyamides with improved storage stability and good ability to anchore polyvinylidene halide copolymers to cellulose-containing substances, obtained by condensing 35–45 % by weight of polyalkylene polyamines, 45–60 % by weight of dicarboxylic acids hahving 3–10 carbon atoms and 5–20 % by weight of at least one member of the group, consisting of diamine, ε-caprolactam and amino caproic acid, wherein 1 mol equivalent of each of the secondary amino groups of said copolyamide is reacted with from 0.1–0.4 mol of epichlorhydrin for crosslinking.

Surprisingly this copolyamides crosslinked with a certain inadequacy of epichlorhydrin are resins with improved adhesion and anchorage properties and have additionally a greatly improved storage stability, namely an improvement from the original figure of 11 days to more than 300 days in acid medium. Another surprising factor was that the improved anchoring effect occurred not only between two cellulose products, but also between cellulose products on the one hand and polyvinylidene halide copolymer products on the other hand.

It can be assumed from the higher amine number found in the product according to the invention that the secondary amino groups still predominantly present in the anchoring product react during drying with the functional groups in the cellulose on the one hand and in the polyvinylidene halide copolymer product on the other hand to produce a crosslinking effect. Another major advantage of the invented product is that the aqueous solution of the anchoring product can immediately be spread without difficulty over the surface of the cellulose-containing sheet structures without causing either bead formation or wave-like deformation of the cellulose-containing sheet structure. Accordingly, the layer of lacquer is also able to develop without interruption over the entire surface. Thus considerably reducing the permeability of the sheet structure to oxygen. In the special application of the inventive product in th production of cellulose-containing tubular sausage casing lacquered with polyvinylidene halide copolymers, none of the disadvantages referred to earlier occurred during storage of the sausage. By virtue of the high stability in storage of the water-soluble, thermo-setting inventive product, it is also possible to use larger quantities of water which is beneficial for long periods of use, and also for storing sausage products much more easily.

Especially suitable polyalkylene polyamines are diethylene triamine, triethylene tetramine, tetraethylene pentamine.

Particularly suitable dicarboxylic acids are those having the formula $$COOH - Y - COOH$$

in which Y represents:

a. a residue of terephthalic acid or an isomer of the formula

or b. a residue of an aliphatic dicarboxylic acid of the formula $$- (CH_2)_n -$$

wherein $n$ is an iteger of at least 3–10, or a mixture of (a) and (b).

Eminently suitable are adipic acid, azelaic acid, sebacic acid, terephthalic acid and itaconic acid.

Preferred diamine starting components to be polycondensed have the formula $$NH_2 - R - NH_2$$

in which R represents a. a mixture of the two isomers of trimethyl hexamethylene diamine of the formula

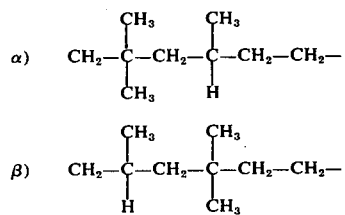

or b. an aliphatic diamine of the formula $$- (CH_2)_m -$$

wherein $m$ is an integer of 2–6, or a mixture of (a) and (b). Though hexamethylene diamine or the said mixture of the isomers of 2,2,4- and 2,4,4-trimethylhexamethylene diamines are preferred, it is also possible to use the mixture of both diamines or other aliphatic diamines within the range of 2–6 carbon atoms.

With reference to the said epichlorhydrin, it is preferred for crosslinking that 1 mol equivalent of each of the secondary amino groups in the copolyamide polycondensed from the monomer mixture is reacted with 0.4 mols of epichlorhydrin.

In other respects, the product according to the invention is also superior in its use as described above to other commercially available anchoring agents based on melamine-formaldehyde resins, such as for example "Madurit" (a product of Messrs. Cassella Farbwerke Mainkur AG, Frankfurt-Fechenheim/Main). Although the wetting of Madurit on the cellulose-containing substrate was good, the anchoring effect between the cellulose-containing substrate on the one hand and the polyvinylidene halide copolymer lacquer on the other hand was considerably poorer. Beside melamine-formaldehyde resins can only be used in low concentrations under the new food laws which do not affect the product according to the invention, which may be defined as water-soluble copolyamide with improved storage stability and good ability to anchore polyvinylidene halide copolymers to cellulose-containing substances, produced by process according to the invention.

The production, properties and use of the water-soluble, thermo-setting synthetic inventive resins are described in the following Examples. Various other resins are also described for the purpose of comparison.

The essential data of these Examples are summarized in the form of a Table at the end of the description.

So far as the properties specified in this Table are concerned, the molar ratios, the solids content of the aqueous synthetic resin solutions in percentages by weight, the amine number after crosslinking in mg of KOH/g of synthetic resin and the pH-value, were all determined by conventional methods known to the expert. The storage stability values were obtained by storing the aqueous solutions on the one hand and the aqueous hydrochloric acid solutions adjusted to pH 5.5 on the other hand at a constant temperature of 20°C. In order to determine the lacquer adhesion values, 1 % by weight solutions were prepared from all 6 products produced in accordance with the invention and from all 6 of the comparison products produced in accordance with the Comparison Examples, through which an air-inflated tube of cellulose hydrate film was guided. After the excess synthetic resin solution had been stripped off by means of an air brush arranged over the bath (air pressure 350 mm WC), the treated tube was dried in a following tunnel at a ttemperaute of approximately 100°C. In the next operation, the inflated tube was guided through an aqueous polyvinylidene chloride-copolymer dispersion containing approximately 70 % by weight of water and, after the excess dispersion had been stripped off, the tube was dried in another drying tunnel at 200°C and subsequently wound up. The product AE 17 (produced by Messrs. Wolff Walsrode AG) was used as the polyvinylidene chloride copolymer dispersion, being polymerised from a monomer mixture having a vinylidene chloride-content of 90 %.

The lacquer adhesion test performed on the lacquered product was carried out as follows: a total of six 10 cm long test specimens per example were removed from sheet structures based on the 12 products produced in accordance with the 12 Examples, completely immersed in a bath containing 500 ml of boiling water (A = at pH 7.0; B = 3 % aqueous citric acid solution) and then removed again after a residence time of 30, 60 or 180 minutes in order to carry out the lacquer abrasion test. The lacquer abrasion test was carried out in the usual way simply by placing the test specimen between the thumb and index finger and then gently rubbing the test specimen between the thumb and index finger.

Further illustrations are given in the following special Examples.

EXAMPLE 1 ACCORDING TO THE INVENTION 1588.8 g (15.4 mols) of diethylene triamine, 2046 g (14 mols) of adipic acid and 633.5 g (2.8 mols) of hexamethylene diammonium adipate salt were introduced into a steel autoclave equipped with a contact thermometer, a stirring mechanism and a distillation attachment. After the reaction vessel had been closed, heating was commenced. 430 Ml of water of condensation (85 % of the theoretical amount) were distilled off before the reaction temperature of 170°C had been reached. This was accelerated by the additional through-flow of nitrogen. The post-condensation reaction, during which nitrogen was again passed continuously through the contents of the reaction vessel, was carried out over the next 2 hours at 170°C. After cooling to 130°C, the co-polyaminoamide formed was adjusted with water to a solids content of approximately 25 % by weight. This product had a pH-value of 10.4 and an amine number of 275 (mg of KOH/g of polyamide).

342 g (3.7 mols) of epichlorhydrin were then added to this aqueous polycondensate solution having a solids content of 25 % by weight. The following crosslinking reaction was carried out over a period of 1 hour at 50°C. Thereafter, the completed synthetic resin solution was diluted with water to 10 % by weight, after which it had a pH-value of 8.5 and an amine number of 196 (cf. Table).

The aqueous sythetic resin solution showed excellent stability in storage, being stable, completely serviceable and ungelled after 30 days in a normal aqueous solution and after 300 days in a hydrochloric acid aqueous solution. The storage tests were then terminated. According to the aforementioned Standard Use Example, the wetting of the product applied was good and complete. The lacquer adhesion tests were all satisfactory.

EXAMPLE 2 ACCORDING TO THE INVENTION 1588.8 g (15.4 mols) of diethylene triamine, 2046 g (14 mols) of adipic acid and 319.7 g (2.8 mols) of ε-caprolactam were introduced into a steel autoclave of the kind used in Example 1. The reaction was carried out as described in Example 1. The polycondensate solution subsequently diluted to 25 % by weight had a pH-value of 10.7 and an amine number of 300.

The aforementioned aqueous solution was then reacted with 342 g (3.7 mols) of epichlorhydrin by the crosslinking reaction carried out as described in Example 1. The synthetic resin solution diluted with water to 10 % by weight had a pH-value of 8.6 and an amine number of 218 (mg of KOH/g of polyamide).

The stability of the solution in storage was as high as that of the solution obtained in accordance with Example 1, the tests being terminated after 30 and 300 days. Wetting was again good and complete whilst the lacquer adhesion tests all gave good results.

EXAMPLE 3 ACCORDING TO THE INVENTION 1588.8 g (15.4 mols) of diethylene triamine and 2046 g (14 mols) of adipic acid were introduced into a steel autoclave of the kind used in Example 1, and the temperature in the subsequently closed autoclave was continuously increased. The water of reaction liberated began to distill off at 125°C, a total of 430 ml being collected before 319.7 g (2.8 mols) of caprolactam were added to the reaction mixture, and polycondensation was continued for the next 2 hours at 170°C. As already described, the product was diluted with water to 25 % by weight after cooling. It then had a pH-value of 10.7 and an amine number of 293.

342 g (3.7 mols) of epichlorhydrin were then added to this aqueous polycondensate solution and the reaction was carried out for 1 hour at a temperature of 50°C. The solution resin obtained was then diluted with water to 10 % by weight. It had a pH-value of 8.7 and an amine number of 210 (mg of KOH/g of polyamide).

This solution was also stable after storage for 30 and 300 days in the same way as the other products produced in accordance with the preceding Examples according to the invention. The wetting and lacquer adhesion values were determined in the same way as in the preceding Examples according to the invention and were all good.

EXAMPLE 4 ACCORDING TO THE INVENTION 1588.8 g (15.4 mols) of diethylene triamine, 2046 g (14 mols) of adipic acid and 319.7 g (2.8 mols) of caprolactam were introduced into a steel autoclave of the kind used in Example 1. The polycondensation reaction is carried out as described in Example 1. This was followed by dilution of the concentrated polycondensate solution with water to 25 % by weight. A solution diluted in this way had a pH-value of 10.8 and an amine number of 303.

Thereafter, 178 g (1.93 mols) of epichlorhydrin were added to this aqueous solution and the crosslinking reaction was carried out in the same way as described in Example 1. The completed resin solution diluted with water to 10 % by weight had a pH-value of 9.5 and an amine number of 252.

The solution was still stable and did not gel after 30 and 300 days (tests terminated). The wetting of a cellulose-containing substrate with the product according to the invention produced a coherent coating layer over its entire surface. Despite the relatively small quantity of eqichlorhydrin used for crosslinking, lacquer adhesion was good in every case, and it was only in the more rigorous test carried out in 3 % aqueous citric acid solution that some signs of wear appeared after 180 minutes.

EXAMPLE 5 ACCORDING TO THE INVENTION

In contrast to the preceding Example, which was intended to demonstrate that it was still possible to obtain extremely good values even with a very small quantity of epichlorhydrin, this Example in which a relatively large quantity of epichlorhydrin was added demonstrates that, even with quantities as large as these, it is still possible to obtain satisfactory wetting without bead formation and, in addition, extremely good adhesion properties.

1588.8 g (15.4 mols) of diethylene triamine, 2046 g (14 mols) of adipic acid and 319.7 g (2.8 mols) of caprolactam were introduced into a steel autoclave of the kind used in Example 1. The reaction was carried out in the same way as described in Example 1. After the resulting polycondensate solution had been diluted with water to 25 % by weight, the solution formed had a pH-value of 10.7 and an amine number of 299. Following the addition of 571 g (6.18 mols) of epichlorhydrin to this aqueous solution, the crosslinking reaction was carried out in the same way as described in Example 1, and the solution obtained was subsequently diluted with water to 10 % by weight. The synthetic resin solution obtained had a pH-value of 8.2 and an amine number of 140. This solution was also stable and had not gelled after storage periods of 30 and 300 days. The lacquer adhesion values were all good.

EXAMPLE 6 ACCORDING TO THE INVENTION

This Example demonstrates that the properties of the product according to the invention are not adversely affected where terephthalic acid, sebacic acid, trimethyl hexamethylene diamine, triethylene tetramine, triethylene pentamine and $\epsilon$-caprolactam are polycondensed instead of diethylene triamine, adipic acid and the other monomers mentioned in Examples 1 to 3, and this copolyamide subsequently reacted with epichlorhydrin.

1049 g (6.32 mols) of terephthalic acid, 1557 g (7.68 mols) of sebacic acid, 538 g (3.4 mols) of an isomer mixture of 2,2,4- and 2,4,4-trimethyl hexamethylene diamine, 1239 g (12 mols) of a mixture of triethylene tetramine and triethylene pentamine (molar ratio 1 : 1) and 319.7 g (2.8 mols) of $\epsilon$-caprolactam were introduced into a steel autoclave of the kind used in Example 1 and the polycondensation reaction was carried out as described in that Example.

On completion of the reaction, the solution was diluted with water to 25 % by weight as in the preceding Examples. The resulting solution had a pH-value of 10.5 and an amine number of 295 (mg of KOH/g of polyamide).

342 g (3.7 mols) of epichlorhydrin were then added to this aqueous solution. The crosslinking reaction was carried out in the same way as described in Example 1 according to the invention and the resulting product was diluted with water to 10 % by weight. The completed synthetic resin solution had a pH-value of 8.8 and an amine number of 203 (mg of KOG/g of polyamide).

This solution of the product according to the invention was also stable and had not gelled after storage periods of from 30 and 300 days at room temperature. The product also produced satisfactory wetting of a cellulose-containing substrate, forming a homogenous continuous film over its entire surface. A lacquer applied thereto in the usual way by dispersion showed good adhesion values in every case (cf. Table, Example 6 according to the invention).

COMPARISON EXAMPLE 1A (according to U.S. Pat. No. 2,926,154)

226.8 g (2.2 mols) of diethylene triamine, 100 g of water and 286.2 g (2.0 mols) of adipic acid were introduced into a steel autoclave equipped with a contact thermometer, a stirring mechanism and a distillation attachment. This monomer mixture was then polycondensed for 5 hours at a temperature of 180 to 185°C. Water was distilled off during the initial increase in temperature. Water was added to the resulting reaction product in such a quantity that a 50 % by weight solution of the polyamide was formed. Thereafter, 85.2 g (0.2 mols) of the 50 % by weight aqueous polyamide solution and 120 g of water were introduced into a flask, followed by the dropwise addition of 27.8 g (0.30 mols) of epichlorhydrin over a period of 30 minutes at 50°C. The solution was subsequently stirred for 2 hours at 50°C and then cooled.

The end product had a solids content of 30 %, a pH-value of 8.0 and an amine number of 85 (mg of KOH/g of polyamide).

The resulting resin solution was not stable in storage, but instead had completely gelled after 2 days at a storage temperature of 20°C and was no longer soluble in water. A sample of the solution removed before the beginning of the storage test was adjusted with hydrochloric acid to a pH-value of 5.5. In spite of the known stabilising effect of the hydrochloric acid aqueous solution, this solution had also gelled after only 7 days and could no longer be used.

Determination of the lacquer adhesion values described at the beginning of the Examples was also similarly applied to products obtained in accordance with these Comparison Exmaples. It was only the samples that had been boiled for 30 minutes in a neutral, aqueous solution which still showed satisfactory lacquer adhesion. After boiling for 60 minutes, there was a progressive decrease in lacquer adhesion until, after 180 minutes, it was totally inadequate. The values were considerably poorer in 3 % cirtric acid aqueous solution (cf. Table, test V 1a).

COMPARISON EXAMPLE 1 B (according to U.S. Pat. No. 3,250,664)

93 g (0.9 mols) of diethylene triamine, 20 g (0.136 mols) of triethylene tetramine and 50 g of water were weighed into a steel autoclave equipped with a contact thermometer, a stirring mechanism and a distillation attachment. 20 G (0.177 mol) of caprolactam and 145 g (1 mol) of adipic acid were added to this solution. This monomer mixture was heated until the theoretical quantity of water had been distilled off, after which the reaction was continued for a period of 3.5 hours at 195° to 210°C. In the final phase of the reaction, a vacuum was applied for 30 minutes at a temperature of 180° to 190°C by means of a rotary slide valve pump. After cooling, 385 g of water were added, 91 g of the resulting solution were mixed with another 263 g of water and the resulting mixutre was heated to 50°C. 16 g of epichlorhydrin were then added dropwise and the crosslinking temperature increased to 65°C until the specified viscosity had been reached. The solution was finally diluted with 150 g of water and cooled to room temperature.

The end product had a solids content of 9.5 % by weight, a pH-value of 6 and an amine number of 28 (mg of KOH/g of poiyamide).

The product thus reproduced had a stability in storage of only 3 and 8 days, respectively, after which time the product gelled and could no longer be processed. The wetting test produced irregular wetting accompanied by bead formation. In the lacquer adhesion test, it was only the samples that had been boiled for up to 30 minutes in neutral water which showed satisfactory adhesion values. After boiling for 60 minutes, the adhesion values had deteriorated considerably whilst, after boiling for 180 minutes they were totally inadequate. The intensified test carried out in the presence of a 3 % citric acid aqueous solution showed that the lacquer no longer adhered to the substrate after only 30 min.. An aqueous polyvinylidene chloride copolymer dispersion was applied as the lacquer, corresponding exactly in quantity and composition to the dispersions used in all the other Examples.

COMPARISON EXAMPLE 1 C (according to DOS No. 1,696,181)

Since the production of a water-soluble epichlorhydrinpolyamide reaction product is not described in this DOS, the standard commercial product "Kymene 557" which it describes was also investigated with the results set out in the Table under Example No. V 1c. A comparable completed solution showed irregular wetting with a tendency towards bead formation. Lacquer adhesion was only satisfactory after boiling for 30 minutes in neutral water, but deteriorated progressively with increasing boiling time. An intensified test carried out with a boiling hot 3 % citric acid aqueous solution showed that lacquer adhesion was totally inadequate after only 30 minutes.

COMPARISON EXAMPLE 1 D (according to DOS No. 1,696,248)

802 g (5.5 mols) of adipic acid were added with stirring over a period of 2 hours in a stream of nitrogen to 566 g (5.5 mols) of diethylene triamine in a steel autoclave equipped with a contact thermometer, a stirring mechanism and a distillation attachment. During the addition the temperature was kept at 80°C. During the following polycondensation reaction, the mixture was heated to 154°–170°C, 140 g of water of reaction distilling over through a column. 70 g of additional distillate were then recovered in a water jet vacuum at a reaction vessel temperature of 170°C. After subsequent cooling, a total of 500 ml of water was added in portions to the polycondensate at a temperature falling from 110°C, and the product dissolved therein. The resulting solution had a solids content of 72.1 % by weight and an amine number of 402.

To react the polycondensate with glycerin dichlorohydrin, 150 g of the polyamide resin dissolved in water were mixed with 356 g of water and 64.2 g of glycerin dichlorhydrin, and the reaction was carried out with stirring for a period of 2 hours at 60°C. Thereafter, the solution was stabilised by acidification with hydrochloric acid to a pH-value of from 3 to 4 and then cooled. After crosslinking, the solution had an amine number of 40 (mg of KOH/g of polyamide).

The stability of the product in storage at 20°C amounted to 3 days in aqueous solution and to 7 days in corresponding acid solution at pH-5.5, after which time the solution had gelled and could no longer be used. Wetting was poor (bead formation), whilst lacquer adhesion was only satisfactory after boiling for 30 minutes in neutral water, deteriorating considerably thereafter. Total removal of the lacquer occurred after 180 minutes in neutral aqueous solution and after boiling for only 60 minutes in 3 % aqueous citric acid solution. Accordingly, the product could not be used as an agent for anchoring a polyvinylidene halide copolymer lacquer to a cellulose-containing substrate.

COMPARISON EXAMPLE 1 E (according to DOS No. 1,906,561)

226.8 g (2.2 mols) of diethylene trimaine, 100 g of water and 286.2 g (2.0 mols) of adipic acid were introduced into a steel autoclave equipped with a contact thermometer, a stirring mechanism and a distillation attachment, and the reaction temperature was initially increased slowly, with water of reaction distilling off, and finally to 175°C accompanied by the addition of a total of 45.2 g (0.4 mols) of ε-caprolactam. The temperature of 175°C was maintained for a reaction time of 2 hours and water was subsequently added to the reaction product formed until a 50 % by weight aqueous solution of the copolyamide was obtained, having a pH-value of 10.8 and an amine number of 290 (mg of KOH/g of copolyamide). 25.5 g (0.1 mol) of this 50 % aqueous solution of the copolyamide were removed from the steel autoclave and introduced into another autoclave together with water and 13.9 g (0.15 mol) of epichlorhydrin. The subsequent crosslinking reaction was carried out for 2 hours at a temperature of 50°C, resulting in the formation of an aqueous solution of the correspondingly crosslinked synthetic resin having a solids content of approximately 30 % by weight, a pH-value of 7.1 and an amine number of 40 (mg of KOH/g of polyamide. Tests carried out with this reproduced product solution showed that its stability in storage was not 30 days as stated, but only 5 days in neutral aqueous medium and 11 days in hydrochloric acid medium at pH-5.5, after which the solution gelled and could no longer be used. The product did not produce satisfactory wetting of corresponding substrates (bead formation), in addition to which its anchoring strength determined by the usual lacquer adhesion test) was only satisfactory for the first 30 minutes in boiling, neutral aqueous solution, deteriorating drastically after only 60 minutes and resulting in total removal of the lacquer after 180 minutes. As expected, the intensified test carried out in 3 % aqueous citric acid solution produced even poorer results so that the reproduced product could not be used as an agent for anchoring polyvinylidene halide copolymers to cellulose-containing substrates.

COMPARISON EXAMPLE 1 F ("Madurit" — test)

In order to demonstrate the superiority of the anchoring agent according to the invention to other standard commerical anchoring agents which are not produced on a polyamideepichlorhydrin basis, a melamine-formaldehyde resin of the type known as "Madurit" (a product of Messrs. Cassella Farbwerke Mainkur AG, Frankfurt-Fechenheim/M) was used as an anchoring agent in comparable concentration (10 % by weight solids content of the aqueous synthetic resin solution) and the wetting and lacquer-adhesion test carried out in the usual way following the application of "Madurit" to a regenerated cellulose hydrate tube, followed by coating with a comparable polyvinylidene halide copolymer dispersion. Although Madurit produced satisfactory wetting of the tube, the lacquer adhesion test showed that at as an anchoring agent even "Madurit" gave only moderate to unsatisfactory results (cf. Table, column V 1d).

In the interests of clarity, all the essential data from the 12 preceding Examples are summarised in the following Table, in which V = comparison Example, E = Example according to the invention whilst the term "poor" in the column entitled "wetting of the product applied" means bead formation through uneven distribution of the anchoring agent. In the column entitled "lacquer adhesion test", the term "good" means no removal of the lacquer, the term "moderate" means appreciable removal of the lacquer whilst the term "poor" means complete removal of the lacquer.

| Ex. No. | Product according to | Molar ratio of sec.amino groups of epichlorhydrin | Solids content of the aqueous synthetic resin solution in % by weight | Amine No. mg of KOH/g of polyamide | pH-value | Storage stability in aqueous solution pH 7.0 | 5.5 | Wetting of the substrate | Lacquer adhesion test in aqueous solution at 100°C A=pure water; B=3% citric acid solution | | | | | |
|---|---|---|---|---|---|---|---|---|---|---|---|---|---|---|
| | | | | | | | | | 30 | | 60 | | 180 | |
| | | | | | | | | | A | B | A | B | A | B |
| E 1 | Example 1 | 1.0:0.25 | 10 | 196 | 8.5 | 30 | 300 | good | good | good | good | good | good | good |
| E 2 | Example 2 | 1.0:0.25 | 10 | 218 | 8.6 | 30 | 300 | good | good | good | good | good | good | good |
| E 3 | Example 3 | 1.0:0.25 | 10 | 210 | 8.7 | 30 | 300 | good | good | good | good | good | good | good |
| E 4 | Example 4 | 1.0:0.125 | 10 | 252 | 9.5 | 30 | 300 | good | good | good | good | good | good | moderate |
| E 5 | Example 5 | 1.0:0.40 | 10 | 140 | 8.2 | 30 | 300 | good | good | good | good | good | good | good |
| E 6 | Example 6 | 1.0:0.25 | 10 | 203 | 8.8 | 30 | 300 | good | good | good | good | good | good | good |
| V1a | US 2,926,154 | 1.0:1.5 | 10 | 85 | 8.0 | 2 | 7 | poor | good | moderate | moderate | poor | poor | poor |
| V1b | US 3,250,664 | 1.0:1.2 | 10 | 28 | 6.0 | 3 | 8 | poor | good | poor | moderate | poor | poor | poor |
| V1c | DOS 1,696,181 | 1.0:1.5 | 10 | | | | | poor | good | poor | moderate | poor | poor | poor |
| V1c | DOS 1,696,248 | 1.0:1.0 | 10 | 40 | 3.5 | 3 | 7 | poor | good | moderate | moderate | poor | poor | poor |
| V1e | DOS 1,906,561 | 1.0:1.5 | 10 | 40 | 7.1 | 5 | 11 | poor | good | moderate | moderate | poor | poor | poor |
| V1f | "Madurit" (R) | — | 10 | — | 4 | — | — | good | — | moderate | — | poor | — | poor |

What we claim is:
1. Water-soluble resinous copolyamide with improved storage stability and good ability to anchor polyvinylidene halide copolymers to cellulose-containing substances, consisting essentially of resinous condensation product of 35–45% by weight of polyalkylene polyamine, 45–60% by weight of dicarboxylic acid selected from the group consisting of adipic acid, azelaic acid, sebacic acid and terephthalic acid; and 5–20% by weight of at least one member of the group consisting of saturated aliphatic diamine, ε-caprolactam and amino caproic acid; wherein 1 mol equivalent of each of the secondary amino groups of said copolyamide is reacted with from 0.1–0.4 mol of epichlorohydrin for crosslinking; wherein the percent by weight of reactants is based on the total weight of reactants before reaction with epichlorohydrin.

2. The water-soluble resinous copolyamide of claim 1 wherein the said diamine is $$NH_2 - R - NH_2$$

in which R is
a. a mixture of

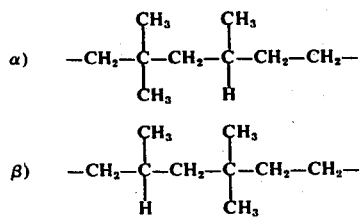

or (b) $-(CH_2)_m-$ wherein $m$ is an integer of 2–6; or a mixture of (a) and (b).

3. The water-soluble resinous copolyamide of claim 1 wherein the said diamine to be polycondensed is hexamethylene diamine.

4. The water-soluble resinous copolyamide of claim 1 wherein a copolyamide obtained by condensation of a diethylene triamine, adipic acid and ε-caprolactam is reacted with epichlorohydrin for crosslinking.

5. The water-soluble resinous copolyamide of claim 1 wherein said polyalkylene polyamine is diethylene triamine, triethylene tetramine or tetraethylene pentamine.

6. The water-soluble resinous copolyamide of claim 1 wherein said polyalkylene polyamine is diethylene triamine.

* * * * *